(12) United States Patent
Chen et al.

(10) Patent No.: US 10,951,733 B2
(45) Date of Patent: Mar. 16, 2021

(54) ROUTE SELECTION METHOD AND SYSTEM, NETWORK ACCELERATION NODE, AND NETWORK ACCELERATION SYSTEM

(71) Applicant: WANGSU SCIENCE & TECHNOLOGY CO., LTD., Shanghai (CN)

(72) Inventors: Kailin Chen, Shanghai (CN); Xiaopeng Liu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/326,779

(22) PCT Filed: Mar. 28, 2017

(86) PCT No.: PCT/CN2017/078398
§ 371 (c)(1),
(2) Date: Feb. 20, 2019

(87) PCT Pub. No.: WO2018/152919
PCT Pub. Date: Aug. 30, 2018

(65) Prior Publication Data
US 2019/0182351 A1 Jun. 13, 2019

(30) Foreign Application Priority Data
Feb. 21, 2017 (CN) .......................... 201710093502.7

(51) Int. Cl.
*H04L 29/08* (2006.01)
*H04L 12/721* (2013.01)
*H04L 12/26* (2006.01)

(52) U.S. Cl.
CPC .......... *H04L 67/32* (2013.01); *H04L 43/0852* (2013.01); *H04L 45/70* (2013.01); *H04L 67/1029* (2013.01)

(58) Field of Classification Search
CPC ..... H04L 67/32; H04L 45/70; H04L 67/1029; H04L 43/0852; H04L 43/0894;
(Continued)

(56) References Cited

U.S. PATENT DOCUMENTS

2004/0022224 A1 2/2004 Billhartz
2009/0300407 A1* 12/2009 Kamath ................ H04L 67/101
714/4.11
(Continued)

FOREIGN PATENT DOCUMENTS

CN 104618237 A 5/2015
CN 104954219 A 9/2015
(Continued)

OTHER PUBLICATIONS

The European Patent Office (EPO) the Extended European Search Report for 17897430.9 dated Sep. 30, 2019 8 Pages.
(Continued)

*Primary Examiner* — Kristie D Shingles
(74) *Attorney, Agent, or Firm* — Anova Law Group, PLLC

(57) ABSTRACT

A route selection method, a route selection system, a network acceleration node, and a network acceleration system are provided. The route selection method comprises detecting, by an ingress network acceleration node, a link delay from the ingress network acceleration node to each egress network acceleration node, and determining whether each egress network acceleration node is available; obtaining, by the ingress network acceleration node, from an available egress network acceleration node, a link delay from the
(Continued)

available egress network acceleration node to a source site IP; and selecting a desired route from the ingress network acceleration node to the source site IP based on a link delay from the ingress network acceleration node to an available egress network acceleration node and a link delay from the available egress network acceleration node to the source site IP.

15 Claims, 2 Drawing Sheets

(58) Field of Classification Search
CPC ............. H04L 43/0829; H04L 43/0882; H04L 43/0805; H04L 43/0811
USPC .......................................................... 709/241
See application file for complete search history.

(56) References Cited

U.S. PATENT DOCUMENTS

| | | | | |
|---|---|---|---|---|
| 2014/0304402 | A1* | 10/2014 | Prakash | .................. H04L 41/12 709/224 |
| 2015/0036493 | A1* | 2/2015 | Cj | ....................... H04L 12/4641 370/235 |
| 2017/0324628 | A1* | 11/2017 | Dhanabalan | ........ H04L 43/0852 |
| 2017/0339247 | A1* | 11/2017 | Tiwari | ................ H04L 41/0806 |

FOREIGN PATENT DOCUMENTS

| | | |
|---|---|---|
| CN | 105515915 A | 4/2016 |
| CN | 105657006 A | 6/2016 |
| CN | 105704034 A | 6/2016 |
| WO | 2004073269 A1 | 8/2004 |

OTHER PUBLICATIONS

Perkins et al:"Quality of Service for Ad hoc On-Demand Distance Vector Routing draft-perkins-aodyqos-00.txt" Mobile Ad Hoc Networking Working Group of the IETF, Internet Draft, Nov. 14, 2001.
Johnson D B et al:"DSR the Dynamic Source Routing Protocol for Multihop Wireless Ad Hoc Networks"Internet Citation, Jan. 1, 2001(Jan. 1, 2001) Retrieved from the Internet:URL: citeseer.nj.nec.com/johnson01dsr.html.
The World Intellectual Property Organization (WIPO) International Search Report and Written Opinion for PCT/CN20171078398 dated Nov. 22, 2017 13 Pages.

* cited by examiner

ROUTE SELECTION METHOD AND SYSTEM, NETWORK ACCELERATION NODE, AND NETWORK ACCELERATION SYSTEM

CROSS-REFERENCES TO RELATED APPLICATIONS

This application is a national phase entry under 35 U.S.C § 371 of International Application No. PCT/CN2017/078398, filed on Mar. 28, 2017, which claims priority of Chinese Patent Application No. 201710093502.7, filed with the State Intellectual Property Office of P. R. China on Feb. 21, 2017, the entire contents of all of which are incorporated herein by reference.

FIELD OF THE DISCLOSURE

The present disclosure generally relates to the field of network acceleration technology and, more particularly, relates to a route selection method and system, a network acceleration node, and a network acceleration system.

BACKGROUND

As the computer network technology advances continuously, the Internet technology has become an important part of human life. Users have increasingly higher requirements on the network transmission speed and the feedback speed for the user request. In the earliest technology architecture, user request data is directly sent to a source site server, and after being processed by the source site server based on the user request, the feedback is directly sent back to the user. Because issues such as a long geographic distance, the user and the source site server belonging to different network carriers, transmission line being damaged, and overload of the transmission line, etc., may exist between the user and the source site server, the communication between the user and the source site may show phenomena such as slow transmission, slow feedback, high cost, and transmission interruption, etc. Thus, not only the user's Internet surfing experience may be affected, but also the content provider's cost may be increased. Further, other unpredictable losses may also occur.

With the improvement and advancement of the technologies, the above described issues in existing technologies may be alleviated by establishing an application acceleration network between the user and the source site. The application acceleration network is a network data acceleration system for boosting the data transmission speed between the user and the source site. For different source sites visited by users in different regions, transmission routes with relatively good quality may be selected respectively to accelerate the data transmission. The application acceleration network mainly uses an architectural mode including a central server and a network acceleration node. In such mode, the network acceleration node may be responsible for detecting the link status between itself and the source site and the link status between itself and other connected network acceleration nodes, and reporting the detection results to the central server. Based on the detection result from each network acceleration node, the central server may select a desired route from the user to the source site, and may send the selection result to each network acceleration node. The network acceleration node may transmit and feedback the user request based on the selection result.

However, the existing network acceleration mode may have the following shortcomings. (1) When a particular network acceleration node receives a user request, every network acceleration node in the application acceleration network may need to add a task of detecting the link status between itself and the source site and add a task of detecting the link status between itself and other connected network acceleration nodes. Accordingly, the number of detection tasks may increase dramatically, the detection traffic may need to occupy a relatively large bandwidth, and even the service traffic may be affected. (2) The substantial number of detection tasks may be reported to the central server, resulting in a particularly high calculation pressure on the central server, thereby affecting the feedback speed of the central server. As such, although the existing application acceleration network improves the speed and quality of the data transmission between the user and the source site to certain extent, the existing application acceleration network has its own shortcomings, thus failing to meet the ever growing user demands and being unable to provide better user experience.

BRIEF SUMMARY OF THE DISCLOSURE

To address the aforementioned shortcomings in the existing technology, the present disclosure provides a route selection method and system, a network acceleration node, and a network acceleration system. In the technical solution according to the present disclosure, the network acceleration node may select a desired route to the source site. Thus, the number of route detection tasks may be reduced, the quality of the route selection may be optimized, and the efficiency of the route selection may be improved.

To achieve the above objective and other related objectives, the present disclosure provides a route selection method, comprising the following steps: detecting, by an ingress network acceleration node, a link delay from the ingress network acceleration node to each egress network acceleration node, and determining, by the ingress network acceleration node, whether every egress network acceleration node is available, where the ingress network acceleration node is configured to receive a user access request; obtaining, by the ingress network acceleration node, from each available egress network acceleration node, a link delay from each available egress network acceleration node to a source site IP; and selecting, by the ingress network acceleration node, a desired route for the user access request to reach the source site IP based on the link delays from the ingress network acceleration node to each available egress network acceleration nodes and link delays from each available egress network acceleration nodes to the source site IP.

In one embodiment, determining, by the ingress network acceleration node, whether each egress network acceleration node is available includes the following steps: detecting and obtaining, by the ingress network acceleration node, a delay, a packet loss rate, a load, and a bandwidth utilization rate of the link from the ingress network acceleration node to the egress network acceleration node; and when one or more of the delay, the packet loss rate, the load, and the bandwidth utilization rate of the link from the ingress network acceleration node to the egress network acceleration node are below the corresponding pre-determined thresholds, determining the egress network acceleration node as available.

In one embodiment, the ingress network acceleration node calculates a total link delay from the ingress network acceleration node to each available egress network acceleration node and from each available egress network acceleration node to the source site IP to select the desired route having the minimum total link delay.

In one embodiment, the link delay from the ingress network acceleration node to the egress network acceleration node and the link delay from the egress network acceleration nodes to the source site IP are calculated using an averaging method.

In one embodiment, the route selection method further includes a route-saving step configured to save the desired route.

In one embodiment, before the detecting step, the route selection method further includes a querying step, where the selected route that is saved is queried according to information of the user access request; and when a corresponding record exists, the saved desired route is directly selected as a route of the user access request.

In one embodiment, the ingress network acceleration node classifies the source site IPs that belong to a same service carrier and a same geographic region into a same IP group, and for each IP group, a route table is used to save each route used by the IP group and the number of times each route is used. When the ingress network acceleration node receives a user access request regarding a certain source site IP, if no route selection is performed on the source site IP, the route that has the highest number of usage times in the route table corresponding to the IP group where the source site IP belongs to is selected as the desired route for the user access request.

In one embodiment, a history route table is generated at the ingress network acceleration node, the history route table is configured to save a history route from a user IP to a source site IP, and each history route is configured to have an effective period of time. In the effective period of time, regarding the access request to the same source site IP by the same user IP, the history route from the user IP to the source site IP saved in the history route table is used, and the effective period of time is reset.

The present disclosure further provides a route selection system, comprising: a detecting module, an analyzing and processing module, a sending and receiving module, and a computing and processing module. The detecting module is connected to the analyzing and processing module, the receiving and sending module, and the computing and processing module, respectively. The detecting module is configured to detect a link delay and a packet loss rate from a network acceleration node to another network acceleration node or a source site IP, obtain a load and a bandwidth utilization rate of the other network acceleration node, and send the detection result to the analyzing and processing module or the receiving and sending module. The analyzing and processing module is configured to receive the detection result from the detecting module, determine whether an egress network acceleration node is available based on the detection result, and send the determination result to the receiving and sending module, where the egress network acceleration node is the last-hop network acceleration node connected to the source site. The computing and processing module is configured to obtain, from the receiving and sending module, the link delay from the network acceleration node itself to an available egress network acceleration node and the link delay from the available egress network acceleration node to a source site IP, calculate a sum of the two link delays, select a route having the minimum sum of link delay as the route selection result, and send the route selection result to the receiving and sending module. The receiving and sending module is configured to receive a user access request, a detection result from the detecting module, the determination result of the analyzing and processing module, and the route selection result from the computing and processing module, and send out the detection requests, the detection result, and the route selection result.

In one embodiment, determining, by the analyzing and processing module, whether the egress network acceleration node is available includes the following steps: obtaining, from the detecting module, the delay, the packet loss rate, the load, and the bandwidth utilization rate of the link that reaches the egress network acceleration node; and when one or more of the delay, the packet loss rate, the load, the bandwidth utilization rate of the link are below the corresponding pre-determined thresholds, determining that the egress network acceleration node is available.

In one embodiment, link delays from the ingress network acceleration node to the egress network acceleration node and to the source site IP are detected by the detecting module and calculated by an averaging method.

In one embodiment, the route selection system further includes a storing module. Connected to the receiving and sending module, the storing module is configured to receive the route selection result from the receiving and sending module, and save the route selection result in a route selection table. When a user access request is received, the route selection table is queried first, and when a record of the same user IP accessing the same source site IP exists, the corresponding route is selected for transmission and backdating.

In one embodiment, the route selection system further includes a storing module to save a route table. The route table classifies source site IPs that belong to a same service provider (or carrier) and a same geographic region to a same IP group, and records every route used by the source site IP in each IP group and the number of usage times of each route. When a user access request to a certain source site IP is received, if no corresponding record is be found in the route selection table, the route that has the highest number of usage times in the route table corresponding to the IP group where the source site IP belongs to is selected as the desired route of the user access request.

In one embodiment, the route selection system further includes a storing module. The storing module saves a history route table, and the history route table is configured to save the history route from a user IP to a source site IP and an effective period of time of each history route. In the effective period of time, if a request from the same user IP to the same source site IP is received, the history route from the user IP to the source site IP saved in the history route table is used, and the effective period of time is reset.

Further, the present disclosure provides a network acceleration node, configured to use the disclosed route selection system to select a desired route from the network acceleration node to a source site IP.

Correspondingly, the present disclosure further provides a network acceleration system, comprising a plurality of network acceleration nodes, thereby allowing the user to select the desired route to access a corresponding source site IP via a network acceleration node.

As described above, the route selection method and system, the network acceleration node, and the network acceleration system according to the present disclosure may achieve the following positive effects:

(1) The network acceleration node may calculate the desired route from itself to the source site without introducing a central server, thus improving the efficiency of route selection;

(2) The route detection is only initiated towards available network acceleration nodes, thus reducing the number of times of route detection and improving the quality of the route selection;

(3) The subsequent route selection may be performed based on a previous route selection result, thus improving the efficiency of the route selection;

(4) The link delay is calculated by an averaging method, thus reducing the impact of abnormal data caused by network jitter on the detection result; and (5) Through the use of the history route table, the user access request in the same conversation may be sent back using the original route.

Figure 1:
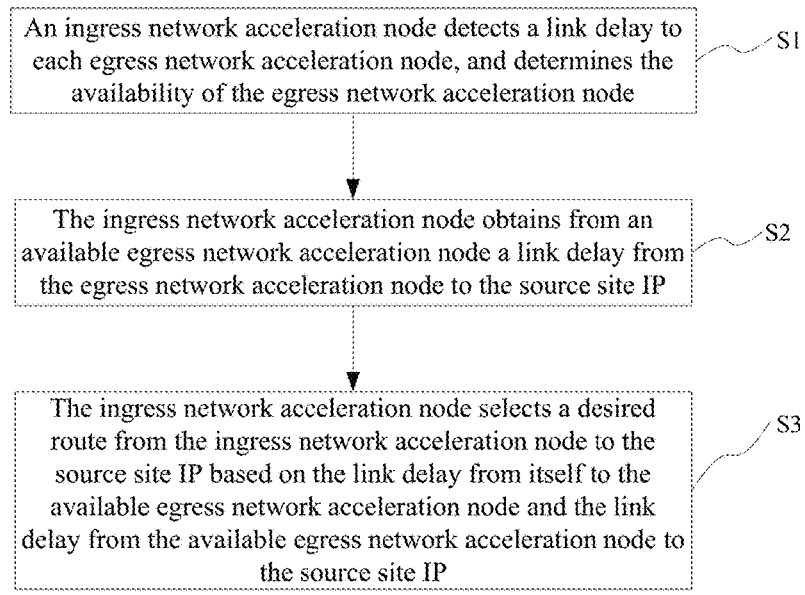
FIG. 1 is a flow chart of an exemplary route selection method according to the disclosed embodiments.

DESCRIPTIONS OF THE REFERENCE NUMERAL OF THE COMPONENTS 10 detecting module
20 analyzing and processing module
30 receiving and sending module
31 receiving unit
32 sending unit
40 computing and processing module
50 storing module
60 querying module
21 user
22 network acceleration system
23 source site

DETAILED DESCRIPTION

Implementations of the present disclosure will be made in detail hereinafter with reference to specific embodiments, and those skilled in the relevant art may readily understand other advantages and effects of the present disclosure via descriptions disclosed in the specification. The present disclosure may be embodied or practiced in other different specific implementations. Each detail described in the specification may be modified or varied based on different perspectives and applications without departing from the spirit of the present disclosure. It should be noted that, when there is no conflict, the following embodiments and the features in the following embodiments may be combined with each other.

It should be noted that, the drawings provided in the disclosed embodiments are intended to illustrate the basic concept of the present disclosure for illustrative purposes. Accordingly, instead of preparing the drawing based on the number, shape, and size of the components in actual implementation, only the components related to the present disclosure are illustrated. In actual implementation, the various components may be arbitrarily changed in type, quantity and proportion, and the component layout may also be more sophisticated.

First, the technical terms in the specification of the present disclosure are described and explained. The following descriptions are technical illustrations of the present disclosure, and the present disclosure is not limited thereto.

A source site denotes a website provided by an Internet content provider to a user for resource access, and may be arranged on servers in different geographic locations and provided by different internet carriers.

A source site IP denotes an IP address corresponding to a source site. A same source site may be assigned with different IP addresses due to the difference in the servers where the source site is located. When a user sends a request to the source site, the request may be eventually directed to a specific source site IP no matter via an IP request method or a DNS request method.

User denotes various user application programs that acquire needed resource service by sending an access request to the source site.

A network acceleration node denotes a proxy service equipment configured at different geographic locations and in networks provided by different carriers. The network acceleration nodes may be connected with each other to form a network, and the network connects the user to the source site.

An ingress network acceleration node denotes a network acceleration node that receives a user access request.

An egress network acceleration node denotes the last-hop network acceleration node connected to the source site.

An intermediate network acceleration node denotes a network acceleration node that accesses the ingress network acceleration node and the egress network acceleration node, respectively.

Delay denotes the time required for a datagram or a packet to be transmitted from one end of a network to the other end of the network.

Packet loss rate denotes a ratio of the amount of the lost data packets over the sent data group.

Load denotes a percentage of the number of task queues over the number of CPU cores.

Bandwidth utilization rate denotes a ratio of used bandwidth to the total bandwidth of a link.

Referring to FIG. 1, FIG. 1 is a flow chart of an exemplary route selection method according to the present disclosure. As shown in FIG. 1, when an ingress network acceleration node according to the present disclosure receives a user access request, the route selection method according to the present disclosure may be used to select a desired route. Specifically, the method includes the following steps.

Step S1: an ingress network acceleration node detects a link delay (RTT1) to each egress network acceleration node, and determines whether each egress network acceleration node is available.

Specifically, determining, by the ingress network acceleration node, whether an egress network acceleration node is available may include the following steps.

11) The ingress network node detects and obtains a delay, a packet loss rate, a load, and a bandwidth utilization rate of the link from the ingress network acceleration node to the egress network acceleration node; and 12) When the delay, packet loss rate, load, and bandwidth utilization rate of the link from the ingress network acceleration node to the egress network acceleration node are all below the corresponding pre-determined thresholds, the egress network acceleration node is determined as available.

In one embodiment, the delay, packet loss rate, load, and bandwidth utilization rate of the link all have corresponding pre-determined thresholds. The pre-determined thresholds may be preset according to the actual status and actual requirement of each network acceleration node. The pre-determined thresholds may be stored in a non-modifiable form or may be stored in a modifiable form in the program of each network acceleration node.

It should be noted that, in one embodiment, when determining whether an egress network acceleration node is available, whether the delay, packet loss rate, load, and bandwidth utilization rate of the link are lower than the pre-determined thresholds may be considered comprehensively. In certain other embodiments, whether one or more of the aforementioned factors are lower than the corresponding thresholds may be considered according to the actual requirement. In addition, the delay, packet loss rate, load, and bandwidth utilization rate of the link may be assigned with corresponding priorities, respectively. When a parameter with certain priority is lower than a pre-determined threshold, the egress network acceleration node may be determined as available. For example, the load and bandwidth utilization rate may be assigned with first priority, delay may be assigned with second priority, and packet loss rate may be assigned with third priority. When at least one of load and bandwidth utilization rate is below the corresponding pre-determined threshold, the egress network acceleration node may be determined as available. Alternatively, when a parameter with priority higher than the second priority is below the corresponding pre-determined threshold, (i.e., when the load, bandwidth utilization rate, and delay are all below the corresponding pre-determined thresholds), the egress network acceleration node may be determined as available.

In certain embodiments, the ingress network acceleration node may also be the egress network acceleration node. That is, the network acceleration node may not only receive a user access request, but also act as the last-hop network acceleration node connected to the source site. As such, in step S1, when the ingress network acceleration node detects the delay, packet loss rate, load, and bandwidth utilization rate of the link that reach each egress network acceleration node, the ingress network acceleration node may also detect the delay, packet loss rate, load, and bandwidth utilization rate of the link that reach the ingress network acceleration node itself.

In one embodiment, the relationship between the ingress network acceleration node and the egress network acceleration node may be direct connection or connection through one or more other network acceleration nodes. In other words, the ingress network acceleration node may reach each egress network acceleration node through one or more intermediate network acceleration nodes or directly without any other network acceleration nodes connected in between. In such architecture, in one embodiment, there are two specific methods of detecting a delay of the link from the ingress network acceleration node to the egress network acceleration node. In the first method, an intermediate network acceleration node may send the delay, packet loss rate, load, and bandwidth utilization rate of the link of the next-hop node to the ingress network acceleration node. The ingress network acceleration node may use the aforementioned determination method to determine the availability of the next-hop node of the intermediate network acceleration node. That is, in the disclosed implementation method, the ingress network acceleration node may be responsible for determining the availability of the intermediate network acceleration nodes and the egress network acceleration node. In the second method, the ingress network acceleration node or the intermediate network acceleration nodes may first detect the delay, packet loss rate, load, and bandwidth utilization rate of the link that reach the next-hop network acceleration node, and may use the aforementioned method to determine the availability of the next-hop network acceleration node. When the next-hop network acceleration node is available, a detection request may be sent to the available next-hop network acceleration node, and the available next-hop network acceleration node may continue to detect and determine the next-hop network acceleration node until the egress network acceleration node is reached. Thus, the delay from the ingress network acceleration node to the egress network acceleration node may be the sum of the delays of each intermediate link. Further, the determination tasks of the availability of each related node may be distributed in the intermediate nodes. Accordingly, the task amount of the ingress network acceleration node may be reduced, thus achieving load balancing.

Step S2: the ingress network acceleration node obtains, from an available egress network acceleration node, a link delay (RTT2) from the egress network acceleration node to a source site IP.

Specifically, the step S2 may include the following steps.

21) The ingress network acceleration node only sends a detection request regarding the source site IP to available egress network acceleration nodes; and 22) The ingress network acceleration node receives link delays (RTT2) of available egress network acceleration nodes reaching the source site IP that are sent by the available egress network acceleration nodes.

Further, when receiving the detection request toward the source site IP, the egress network acceleration nodes may detect the link delays (RTT2) from themselves to the source site IP, and may return the detected link delays (RTT2) to the ingress network acceleration node. In other words, only after receiving a detection request, an egress network acceleration node may detect the link delay from itself to the source site IP.

Step S3: the ingress network acceleration node selects a desired route from the ingress network acceleration node to the source site IP based on the link delays from themselves to the available egress network acceleration nodes and the link delays from the available egress network acceleration nodes to the source site IP.

Specifically, an ingress network acceleration node may calculate the total link delay from itself to the available egress network acceleration node and from the available egress network acceleration node to the source site IP, and a route having the minimum total link delay may be selected as the desired route.

Optionally, when obtaining the link delay from the ingress network acceleration node to the egress network acceleration node and the link delay from the egress network acceleration node to the source site IP, an averaging calculation method may be used for calculation. The average of a plurality of most recent link delays or a plurality of link delays within a certain time period may be calculated as the delay data of the link. Through such method, the effect of abnormal data generated by the network link jitters on the route selection may be reduced.

Figure 2:
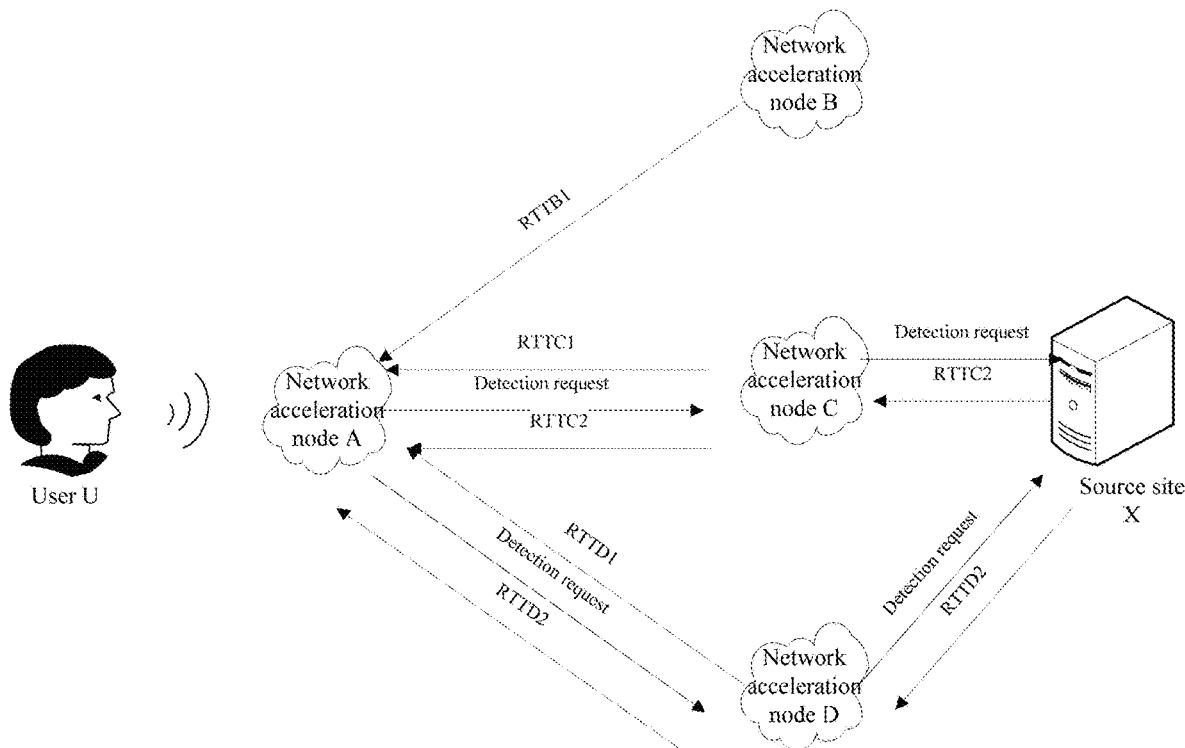
FIG. 2 is a schematic diagram of an exemplary route selection method according to the disclosed embodiments.

The following examples are used to illustrate the route selection method according to the present disclosure. Referring to FIG. 2, FIG. 2 is a schematic diagram of an exemplary route selection method procedure according to the present disclosure. As shown in FIG. 2, in network acceleration nodes A, B, C, and D, node A may be an ingress network acceleration node that receives an access request directly from a user U. Nodes B, C, and D may be egress network acceleration nodes only one hop away from a source site X. In response to an access request by the user U, node A may first detect link delays RTTB1, RTTC1, and RTTD1 that reach nodes B, C, and D, respectively, and may determine whether B, C, and D are available egress network acceleration nodes based on the obtained delay, packet loss rate, load, and bandwidth utilization rate of the link that reach nodes B, C, and D, as well as the corresponding pre-determined thresholds. When the load of node B exceeds the pre-determined threshold, node B may be determined as unavailable. Thus, node A may only send the access request to nodes C and D. After receiving the access request sent by node A, nodes C and D may detect link delays RTTC2 and RTTD2 from themselves to the source site X, and may return the detection results to node A. Node A may calculate the sum of RTTC1 and RTTC2, and the sum of RTTD1 and RTTD2, respectively, and may finally select a route AC corresponding to the sum of RTTC1 and RTTC2 showing a smaller value as the result of the route detection. That is, the route of the ingress network acceleration node A—the egress network acceleration node C—the source site X may be selected as the desired route for the user U to access the source site X.

Optionally, RTTB1, RTTC1, RTTC2, RTTD1, and RTTD2 may be obtained by using an averaging method. That is, average of a plurality of most recent link delays or a plurality of link delays within a certain time period may be calculated as the delay data of the link.

In one embodiment, the route selection method may also include a step of saving the desired route obtained through the aforementioned route selection method. When the same user sends an access request to the same source site IP in a detection cycle, whether a corresponding record exists in the saved desired route may be queried first. When the corresponding record exists, the corresponding route may be directly selected as the current access route. When no corresponding record exists, the desired route may be detected according to the aforementioned method. The desired route record may be saved for one detection cycle. After the current detection cycle ends, the saved record may be cleared, and a desired route detected in a new detection cycle may continue to be saved. The clearing method may be deleting the record directly, or may be hiding the record, and the present disclosure is not limited thereto.

It can be observed that the desired route may be a desired route in the current detection cycle when the same user to send the access request to the same source site IP. That is, in the same detection cycle, when the same user accesses the same source site again, the access request may be transmitted from the ingress network acceleration node to the source site IP according to the previously detected desired route, and the source site IP may backdate along the same route. Thus, the user request may be ensured to obtain the fastest transmission and feedback. When a new cycle begins, the detection may be performed again.

In one embodiment, the ingress network acceleration node may divide the source site IPs into groups according to the network carrier and the geographic location. The source site IPs belonging to a same carrier and a same geographic location may be grouped into a same IP group. A route table may be used for each IP group to save every route used by the source site IP in the IP group and the number of times each route is used. Optionally, in the route table, each route used by the IP group may be sorted in a descending order based on the number of times each route is used. Each time a network acceleration node fulfills route selection on a source site IP, the number of usage times of the desired route that is selected may increment by 1.

When the ingress network acceleration node receives an access request to a certain source site IP from the user, if no route selection has been performed on the source site IP (i.e., no corresponding record is found in the desired route records that are saved), the route having the highest number of route usage times in the route table corresponding to the IP group where the source site IP belongs to may be selected as the route of the current access request. At the same time, the aforementioned route selection method may be used to perform the route selection on the current access request and save the detection result for subsequent use by the same user sending the same access request.

When no route selection has been performed on the source site IP and no corresponding IP group record exists, the current access request may be transmitted and backdated according to a pre-determined default route. At the same time, the aforementioned route selection method may be used to perform route selection on the current access request and save the detection result.

As such, when a user access request occurs for the first time in a detection cycle, an ingress network acceleration node may select a desired route for transmission and backdating according to the route table or the default route in a timely manner, thereby ensuring the stability of the transmission and feedback of the user access request and ensuring the quality of transmission route to certain extent.

In one embodiment, a history route table may be generated at the ingress network acceleration node. The history route table may be used to save the history route from a user IP to a source site IP, and configure an effective period of time for each history route. In the effective period of time, regarding the access to the same source site IP requested by the same user IP, the history route from the user IP to the source site IP saved in the history route table is used, and the effective period of time is reset.

Specifically, under certain circumstance such as a request based on a TCP protocol, the source site may require that the user IP stays the same during the same conversation. That is, the route from the user IP to the source site IP may need to remain the same during such conversation. Otherwise, the user may be required to re-log in by the source site, and a valid connection may no longer be established. In this case, a history route table may be created at the network acceleration node to save the history route from a user IP to a source site IP, and each history route may be configured to have an effective period of time. In the effective period of time of a history route, if a request sent by the same user IP to the same source site IP is received, the history route from the user IP to the source site IP saved in the history route table is used, and the effective period of time is reset.

The route selection method according to the present disclosure may realize route selection via the ingress network acceleration node, and the egress network acceleration node may detect the source site IP only after receiving a detection request. In this way, not only the existing architecture of the acceleration network is simplified, but also the number of detection tasks at the network acceleration node as well as the eventual selection calculation amount is reduced, thus releasing the bandwidth occupied by excessive detection. In addition, the route selection method according to the present disclosure further takes into consideration the comprehensive factors such as delay, packet loss rate, load, and bandwidth utilization rate of the link in the route selection process, which not only ensures the quality of the transmission route, but also improves the load balancing at each network acceleration node.

Further, by using the averaging method to calculate the link delay, the impact of the network jitter on the delay data may be reduced to certain extent. Through the use of the route table, the user access request that has not performed route detection may be rapidly assigned with a desired route in a timely manner, thus avoiding the occurrence of abnormal feedback speed of the current user access request caused by route selection uncertainty. By using the history route table, the consistency of the route used in the same network conversion may be ensured, thus avoiding the occurrence of the situation where the source site refuses to respond caused by the difference in the route.

Figure 3:
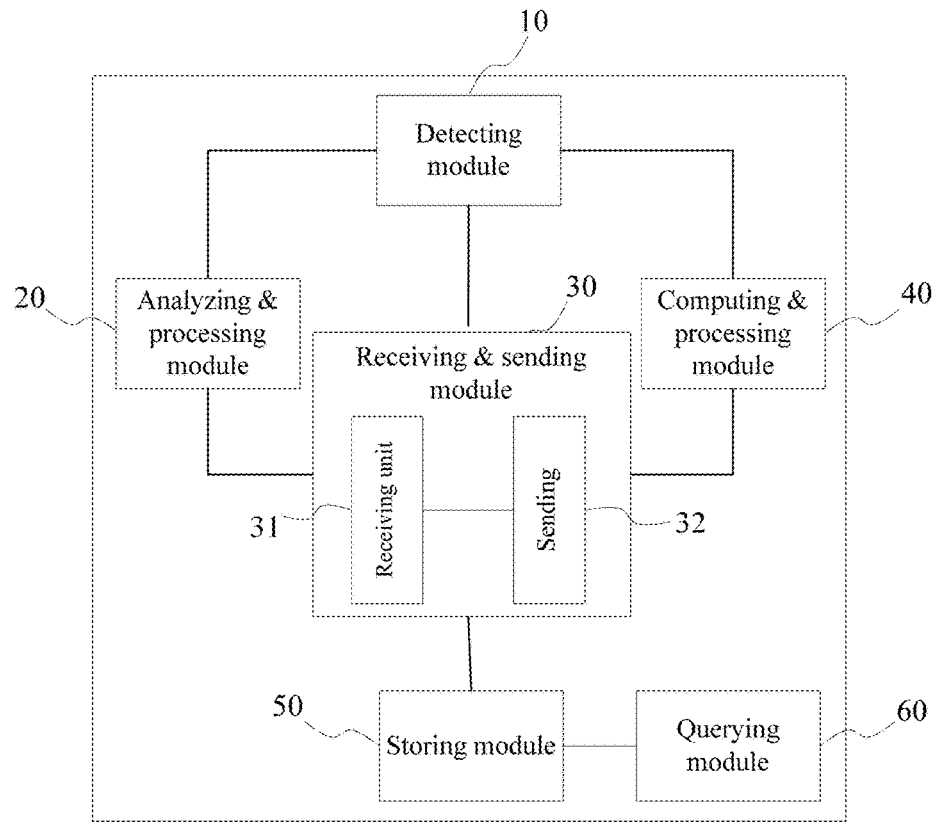
FIG. 3 is a structural schematic diagram of an exemplary route selection system according to the disclosed embodiments.

In addition, the present disclosure also provides a route selection system. Referring to FIG. 3, FIG. 3 is a block diagram of an exemplary route selection system according to the present disclosure. The route selection system according to the present disclosure may include a detecting module 10, an analyzing and processing module 20, a receiving and sending module 30, and a computing and processing module 40. The detecting module 10 and the receiving and sending module 30 may be connected to the other three modules, respectively. The route selection system may be applied to each network acceleration node.

The detecting module 10 may be configured to detect a link delay from a network acceleration node to another network acceleration node or a source site IP, obtain a packet loss rate from itself to another network acceleration node as well as loads and bandwidth utilization rate of other network acceleration nodes, and send the detection result to the analyzing and processing module 20 or the receiving and sending module 30. Specifically, when the network acceleration node is an ingress network acceleration node, when receiving the user access request, the detecting module 10 may detect the delay, packet loss rate, load, and bandwidth utilization rate of the link that reaches the egress network acceleration node, and send the detection result to the analyzing and processing module 20. When the network acceleration node is an egress network acceleration node and the egress network acceleration node receives the detection request from the ingress network acceleration node, the detecting module 10 may detect a delay of the link that reaches the source site IP, and send the detection result to the receiving and sending module 30. The receiving and sending module 30 may return the detection result to the node that sends the detection request. If the network acceleration node is an intermediate network acceleration node in the link from the ingress network acceleration node to the egress network acceleration node, when the ingress network acceleration node detects the link that reaches the egress network acceleration node, the detecting module 10 may detect the delay, packet loss rate, load, and bandwidth utilization rate of the next-hop network acceleration link, and send the detection result to the receiving and sending module 30.

The analyzing and processing module 20 at an ingress network acceleration node may receive the detection result from the detecting module 10, determine whether the egress network acceleration node is available based on the detection result, and send the determination result to the receiving and sending module 20. Specifically, determining, by the analyzing and processing module 20, whether a network acceleration node is available may include the following steps.

11) Receiving a delay, a packet loss rate, a load, and a bandwidth utilization rate of the link from the detecting module 10 itself to the egress network acceleration node; and 12) When the delay, the packet loss rate, the load, and the bandwidth utilization rate are all below the corresponding pre-determined thresholds, determining that the egress network acceleration node is available.

In one embodiment, the delay, packet loss rate, load, and bandwidth utilization rate of the link all have corresponding pre-determined thresholds. The pre-determined thresholds may be preset according to the actual status and actual requirement of each network acceleration node. The pre-determined thresholds stored may be stored in each network acceleration node in a non-modifiable manner or a modifiable manner.

It should be noted that, in one embodiment, when determining whether the egress network acceleration node is available or not, whether the delay, packet loss rate, load, and bandwidth utilization rate of the link are all lower than the corresponding pre-determined thresholds may be comprehensively considered. In certain other embodiments, whether one or more factors are lower than the corresponding thresholds may be considered according to the actual requirement. In addition, the delay, packet loss rate, load, and bandwidth utilization rate of the link may be assigned with corresponding priorities, respectively. When a parameter with certain priority is below the corresponding threshold, the egress network acceleration node may be determined as available. For example, load and bandwidth utilization rate may be assigned with first priority, delay may be assigned with second priority, and packet loss rate may be assigned with third priority. When at least one of load and bandwidth utilization rate falls below the corresponding thresholds, the egress network acceleration node may be determined as available. Alternatively, when parameters with priorities higher than the second priority fall below the corresponding thresholds, i.e., the load, bandwidth utilization rate, and delay, all fall below the corresponding thresholds, the egress network acceleration node may be determined as available.

In certain embodiments, at least one intermediate network acceleration node may be connected between the ingress network acceleration node and the egress network acceleration node. In this case, determining, by the ingress network acceleration node, the availability of the egress network acceleration node may include determining the availability of the intermediate network acceleration nodes. There are mainly two methods of implementation. In the first method, an intermediate network acceleration node may send the detection result of a next-hope node obtained by the detecting module 10 to the ingress network acceleration node through the receiving and sending module 30. The ingress network acceleration node may use the aforementioned determination method to determine the availability of the next-hop node of the intermediate network acceleration node. That is, in such implementation method, the ingress network acceleration node may be responsible for determining the availability of the intermediate network acceleration nodes and the egress network acceleration node. In the second method, the analyzing and processing module 20 of the intermediate network acceleration node may receive the detection result from the detecting module 10, and may determine the availability of the next-hop network acceleration node of the intermediate network acceleration node. That is, in such implementation method, the determination of the availability of each network acceleration node may be fulfilled by the previous-hop network acceleration nodes. As such, task processing amount may be dispersed, thereby better realizing load balancing.

Based on the analyzing and processing result, the computing and processing module 40 may obtain the delay of the link from itself to the available egress network acceleration node from the detecting module 10, and obtain the delay of the link from the available egress network acceleration node to the source site IP from the receiving and sending module 30. The sum of the two link delay may be calculated. The route having the minimum sum of delay may be used as the route selection result, and the route selection result may be sent to the receiving and sending module 30. It should be noted that, in one embodiment, the computing and processing module 40 may obtain the analyzing result from the receiving and sending module 30. In other embodiments, the computing and processing module 40 may obtain the analyzing and processing result directly from the analyzing and processing module 20, or obtain the analyzing and processing result from other sources, and the present disclosure is not limited thereto.

The receiving and sending module 30 may include a receiving unit 31 and a sending unit 32. The receiving unit 31 may receive internal and external data from the network acceleration node, including external data of a user access request, and a detection request and a detection result sent from other network acceleration nodes, and internal data of a detection result from the detecting module 10, an analyzing and processing result from the analyzing and processing module 20, and a route selection result from the computing and processing module 40. The sending unit 32 may send relevant data to an external part of the network acceleration node, including sending a detection request to an available ingress network acceleration node, and sending a detection request and a route selection result to other network acceleration nodes.

Further, in one embodiment, the route selection system may include a storing module 50 and a querying module 60. Connected to the receiving and sending module 30, the storing module 50 may obtain a route selection result from the receiving and sending module 30, and save the route selection result in a route selection table L1. The route selection table may include user information, a source site IP, and a route. The route selection table may be valid in one cycle, and may be cleared at the end of the cycle. The route selection result occurs in a new circle may be saved in the route selection table. When the query module 60 receives a user access request, the query module 60 may first query the route selection table L1 in the storing module. When a corresponding record of the same user accessing the same source site exists, the corresponding route may be selected for transmission and backdating.

When no corresponding record exists in the route selection table L1, an effective route needs to be assigned for the current user access request in a timely manner. In one embodiment, the storing module 50 may include a route selection table L2. The route selection table L2 may classify source site IPs belonging to a same carrier and a same geographic region into a same IP group. For each IP group, each route used by the source site IP in the IP group and the number of usage times of each route may be saved by using a route table. When the ingress network acceleration node receives an access request to a certain source site IP sent by a user and the querying module 60 does not find a corresponding record in the route selection table L1, the route having the highest number of usage times in the route selection table L2 corresponding to the IP group where the source site IP belongs to may be selected as the route of the current access request.

Under certain circumstances, the source site may require the requested user IP to remain unchanged in the same conversation. That is, the route from the same user IP to the source site IP may remain the same within a certain time period. Otherwise, re-login may be required by the source site. In this case, in one embodiment, the storing module 50 may save a history route table L3. The history route table L3 may save the history route from one user IP to one source site IP, and each history route may be configured to have an effective period of time. In the effective period of time, when a request from the same user IP to the same source site IP is received, the querying module 60 may first query the history route table L3. When the corresponding record exists, and the effective period of time has not expired, the history route from the user IP to the source site IP saved in the history route table may be selected, and the effective period of time may be reset. Thus, the access requests from the same user in the same conversation may be ensured to be transmitted along the same route.

The route selection system according to the present disclosure may run at the network acceleration node. That is, the network acceleration node in embodiments of the present disclosure may be an ingress network acceleration node, an egress network acceleration node, or an intermediate network acceleration node in different user access request conversations. When definitions of the network acceleration node are different, the functions of each module in the system may be adjusted accordingly. As such, the network structure formed by the network acceleration nodes is simple, flexible, and may be adaptable to different application scenarios, thereby better satisfying actual needs.

The present disclosure also provides a network acceleration node. The network acceleration node may use the aforementioned route selection system to select the desired route from the network acceleration node to a source site IP.

Figure 4:
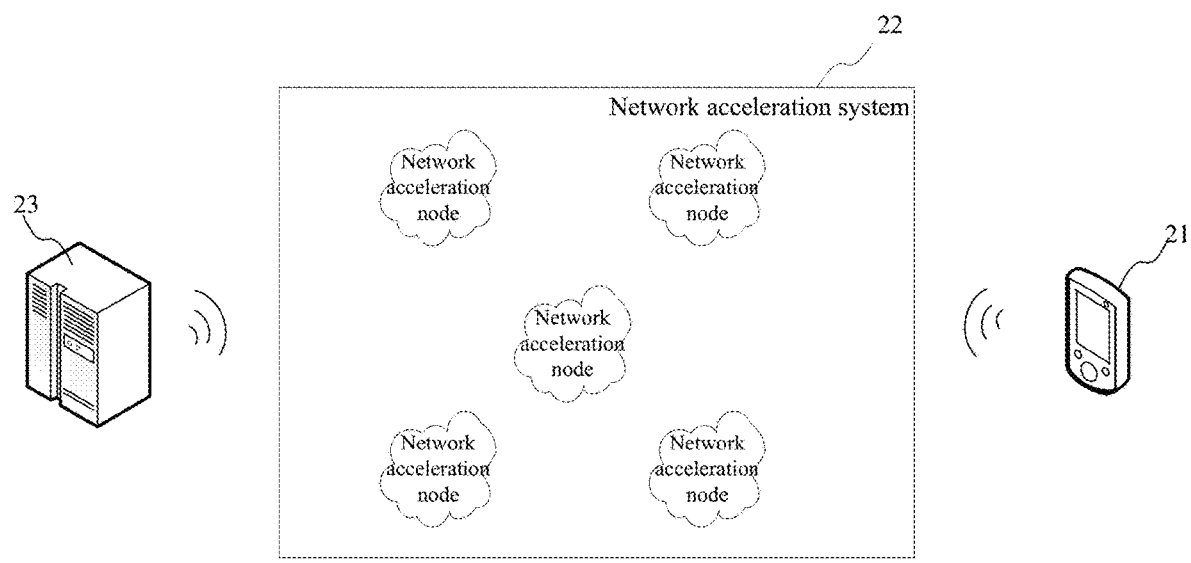
FIG. 4 is a structural schematic diagram of an exemplary network acceleration system according to the disclosed embodiments.

Referring to FIG. 4, FIG. 4 is a structural schematic diagram of an exemplary network acceleration system according to the present disclosure. As shown in FIG. 4, the network acceleration system may include a plurality of aforementioned network acceleration nodes 22, thereby enabling the user 21 to access the IP of the corresponding source site 23 via the network acceleration node by selecting the desired route.

Specifically, the user may send the access request to the corresponding ingress network acceleration node. The route selection system of the ingress network acceleration node may perform selection on the route, and record the desired route from the network acceleration node to the source site IP, such that the user may access the source site IP based on the desired route. Thus, the network access speed may be increased, and the user experience may be improved.

As such, in the route selection method and system, the network acceleration node, and the network acceleration system disclosed by the present disclosure may calculate the desired route to the source site via the network acceleration node itself without introducing the central server, thereby improving the efficiency of the route selection. Route detection may only be performed on available network acceleration nodes, thereby reducing the number of route detection and improving the quality of the route selection. Result may be selected based on the previous route to perform subsequent route selection, thereby improving the route selection efficiency. Thus, the present disclosure may overcome the shortcomings in the existing technology, thus having high industrial utilization value.

The foregoing embodiments are merely used to illustrate the principles and effects, and are not intended to limit the present disclosure. Without departing from the spirit and scope of the present disclosure, anyone skilled in the relevant art may perform modification or alteration on the aforementioned embodiments. Thus, all equivalent modifications or alterations obtainable by those ordinarily skilled in the relevant art without departing from the spirit and technical ideas disclosed by the present disclosure shall fall within the protection scope of the claims of the present disclosure.

What is claimed is:

1. A route selection method, comprising:
   detecting, by an ingress network acceleration node, a link delay from the ingress network acceleration node to each egress network acceleration node, and determining, by the ingress network acceleration node, whether the each egress network acceleration node is available, wherein the ingress network acceleration node is configured to receive a user access request;
   obtaining, by the ingress network acceleration node, from each available egress network acceleration node, a link delay from the each available egress network acceleration node to a source site IP; and
   selecting, by the ingress network acceleration node, a desired route of the user access request to reach the source site IP, based on a link delay from the ingress network acceleration node to the each available egress network acceleration node and a link delay from the each available egress network acceleration node to the source site IP,
   wherein determining, by the ingress network acceleration node, whether the each egress network acceleration node is available includes:
   detecting and obtaining, by the ingress network acceleration node, a delay, a packet loss rate, a load, and a bandwidth utilization rate of a link from the ingress network acceleration node to the each egress network acceleration node; and
   when one or more of the delay, the packet loss rate, the load, and the bandwidth utilization rate of the link from the ingress network acceleration node to the each egress network acceleration node are below corresponding pre-determined thresholds, determining the each egress network acceleration node as available.

2. The route selection method according to claim 1, wherein:
   the ingress network acceleration node calculates a total link delay from the ingress network acceleration node to the each available egress network acceleration node and from the each available egress network acceleration node to the source site IP, and a route having a minimum total link delay is selected as the desired route.

3. The route selection method according to claim 1, wherein:
   the link delay from the ingress network acceleration node to the each egress network acceleration node and the link delay from the each egress network acceleration node to the source site IP are calculated by using an averaging method.

4. The route selection method according to claim 1, further including:
   a route-saving step configured to save the desired route.

5. The route selection method according to claim 4, wherein:
   before detecting, by the ingress network acceleration node, the link delay from the ingress network acceleration node to the each egress network acceleration node, the method further comprises querying the saved desired route based on information of the user access request; and
   when a corresponding record exists, the saved desired route is directly selected as the desired route of the user access request.

6. The route selection method according to claim 1, wherein:
   the ingress network acceleration node classifies a plurality of source site IPs that belong to a same carrier and a same geographic region into a same IP group, and a route table is used for each IP group to save each route used by the IP group and a number of usage times of each route; and
   when the ingress network acceleration node receives a user access request to a certain source site IP and no route selection has been performed on the source site IP, a route that has a highest number of usage times in a route table corresponding to the IP group where the source site IP belongs to is selected as the desired route of the user access request.

7. The route selection method according to claim 1, wherein:
   the ingress network acceleration node generates a history route table configured to save a history route from a user IP to a source site IP, and each history route is configured to have an effective period of time; and
   in the effective period of time, for an access request to a same source site IP by a same user, a history route from the user IP to the source site IP saved in the history route table is used, and the effective period of time is reset.

8. A route selection system, comprising a detecting module, an analyzing and processing module, a receiving and sending module, and a computing and processing module, wherein:
   the detecting module is configured to detect a delay and a packet loss rate of a link from a network acceleration node to other network acceleration nodes or a source site IP, obtain a load and a bandwidth utilization rate of the other network acceleration node, and send a detection result to the analyzing and processing module or the receiving and sending module;
   the analyzing and processing module is configured to receive the detection result from the detecting module or the receiving and sending module, determine whether an egress network acceleration node is available based on the detection result, and send an analyzing and processing result to the receiving and sending module, wherein the egress network acceleration node is a last-hop network acceleration node connected to the source site;
   the computing and processing module is configured to obtain, from the detecting module, a delay of a link from the network acceleration node to each available egress network acceleration node, obtain, from the receiving and sending module, a delay of a link from the each available egress network acceleration node to a source site IP, calculate a sum of the two delays, select a route having a minimum sum of the two delays as a route selection result, and send the route selection result to the receiving and sending module; and the receiving and sending module is configured to receive a user access request, a detection result from the detecting module, a determination result from the analyzing and processing module, a route selection result from the computing and processing module, and detection requests sent by other network acceleration nodes, and transmit the detection requests, the detection result, and the route selection result.

9. The route selection system according to claim 8, wherein determining, by the analyzing and processing module, whether the egress network acceleration node is available includes:

obtaining, from the detecting module, a delay, a packet loss rate, a load, and a bandwidth utilization rate of a link that reach the egress network acceleration node; and when one or more of the delay, the packet loss rate, the load, and the bandwidth utilization rate of the link are below corresponding pre-determined thresholds, determining the egress network acceleration node as available.

10. The route selection system according to claim 8, wherein:

link delays from the ingress network acceleration node to the egress network acceleration node and to the source site IP are detected by the detecting module and calculated by an averaging method.

11. The route selection system according to claim 8, further including a storing module, wherein:

the storing module is connected to the receiving and sending module, and is configured to receive a route selection result from the receiving and sending module and save the route selection result in a route selection table; and when a user access request is received, the route selection table is queried first, and when a record of a same user IP accessing a same source site IP exists, a corresponding route is selected for transmission and backdating.

12. The route selection system according to claim 8, further including a storing module, wherein:

the storing module saves a route table configured to classify a plurality of source site IPs that belong to a same carrier and a same geographic region into a same IP group, and record every route used by the source site IP in each IP group and a number of usage time of the each route; and when a user access request to a certain source site IP is received and no corresponding record exists in the route table, a route that has a highest number of usage times in the route table corresponding to an IP group where the source site IP belongs to is selected as a desired route of the user access request.

13. The route selection system according to claim 8, further including a storing module, wherein:

the storing module saves a history route table configured to save a history route from a user IP to a source site IP and an effective period of time for each history route; and in the effective period of time, when an access request to a same source site IP from a same user is received, a history route from the same user IP to the same source site IP saved in the history route table is used, and the effective period of time is reset.

14. A network acceleration node, wherein:

the network acceleration node is configured to use the route selection system according to claim 8 to select a desired route from the network acceleration node to a source site IP.

15. A network acceleration system, comprising:

a plurality of network acceleration nodes includes the network acceleration node according to claim 14, thereby allowing a user to select the desired route to access a corresponding source site IP via the plurality of network acceleration nodes.

* * * * *